United States Patent [19]

Franks et al.

[11] 4,284,545

[45] Aug. 18, 1981

[54] COMPOSITION AND PROCESS FOR MAKING PRECIPITATED NYLON-POLYVINYL ALCOHOL BICONSTITUENT COMPOSITION

[75] Inventors: Neal E. Franks, Suffern, N.Y.; Julianna K. Varga, Asheville, N.C.

[73] Assignee: Akzona Incorporated, Asheville, N.C.

[21] Appl. No.: 54,359

[22] Filed: Jul. 2, 1979

Related U.S. Application Data

[63] Continuation-in-part of Ser. No. 938,907, Sep. 1, 1978, Pat. No. 4,196,282, which is a continuation-in-part of Ser. No. 854,957, Nov. 25, 1977, Pat. No. 4,145,532.

[51] Int. Cl.$^3$ .................. C08L 29/04; C08L 77/06
[52] U.S. Cl. .................. 260/29.6 NR; 260/29.2 N; 525/56
[58] Field of Search .................. 260/29.6 NR, 29.2 N

[56] References Cited

U.S. PATENT DOCUMENTS

| 2,179,181 | 11/1939 | Graenacher et al. | 106/163 R |
| 2,744,292 | 5/1956 | Schlosser et al. | 106/168 |
| 3,447,939 | 6/1969 | Johnson | 536/43 |
| 3,508,941 | 4/1970 | Johnson | 106/162 |
| 3,758,457 | 9/1973 | Broeck et al. | 536/57 |

Primary Examiner—Harold D. Anderson
Attorney, Agent, or Firm—Francis W. Young; Jack H. Hall; H. Walter Haeussler

[57] ABSTRACT

A composition and process are provided for making precipitated biconstituent nylon-polyvinyl alcohol shaped articles by dissolving polyvinyl alcohol and a nylon having an amide group index of less than about 145 in a mixture of a tertiary amine oxide solvent and water, with the solution containing from about 3.0 to about 11% water, to form a biconstituent dispersion wherein the nylon and the polyvinyl alcohol comprise distinct separate phases. Shaped articles can be formed from the biconstituent dispersions of the invention.

14 Claims, No Drawings

COMPOSITION AND PROCESS FOR MAKING PRECIPITATED NYLON-POLYVINYL ALCOHOL BICONSTITUENT COMPOSITION

CROSS REFERENCE TO RELATED APPLICATIONS

This application is a continuation-in-part of application Ser. No. 938,907 filed Sept. 1, 1978 now U.S. Pat. No. 4,196,282, which in turn is a continuation-in-part of application Ser. No. 854,957, filed Nov. 25, 1977, now U.S. Pat. No. 4,145,532.

BACKGROUND OF THE INVENTION

A process for dissolving nylon, polyvinyl alcohol, or other materials having strong intermolecular hydrogen bonding in a tertiary amine oxide is disclosed by Johnson in U.S. Pat. No. 3,447,939. A cyclic mono(N-methylamine-N-oxide) compound such as N-methylmorpholine-N-oxide is used as the solvent. The solution can be used in chemical reactions involving the dissolved polymer or to precipitate the polymer to form a film or filament. The resulting solutions, insofar as the actual examples of the patent indicate, have significant disadvantages because they are of low solids content and have a high viscosity.

In accordance with the process disclosed in U.S. Pat. No. 3,508,941, two or more different polymers are dissolved in a cyclic mono(N-methylamine-N-oxide) compound and are precipitated together to produce a bicomponent polymer mixture. A diluent such as dimethyl sulfoxide, N-methylpyrrolidone or sulfolane may be added to the solution as a diluent to reduce its viscosity. The solutions also have the same deficiences noted for the first mentioned patent.

Application Ser. No. 054,358, now U.S. Pat. No. 4,247,431 of even date herewith, to the inventors herein, entitled "Composition and Process For Making Precipitated Nylon" discloses nylon solutions and precipitated nylon articles formed from a tertiary amine oxide solvent containing from about 0.5% to about 11% water.

DESCRIPTION OF THE INVENTION

A composition and process are provided for making precipitated biconstituent nylon-polyvinyl alcohol shaped articles by dissolving polyvinyl alcohol and nylon in a tertiary amine oxide solvent whereby the resulting dispersions contain from about 3 and preferably about 5 to about 11% water, to form a biconstituent dispersion wherein the nylon and the polyvinyl alcohol comprise distinct separate phases. For example, in one embodiment the dispersion comprises two continuous phases codispersed within each other. Shaped articles can be formed from the biconstituent dispersions of the invention, for example, wherein the article contains the codispersed polymers.

The nylon solutions which are used in the process of the invention are formed by the process described in applicants' above mentioned concurrently filed application which is hereby incorporated by reference. The amount of nylon dissolved in the solution may be varied up to about 50% by weight of solution, preferably from about 5% to about 35% by weight.

In the nylon solutions useful in the invention, a nylon having an amide group index of less than 145 is mixed with a solvent therefor containing a tertiary amine oxide and a specifically defined critical range of water to provide a solution of increased solids content and of lower dissolution temperature.

The range of the amount of water present in the solution is a nylon solubility enhancing amount of water between about 0.5% to about 11%, preferably between about 1% to about 11% and most preferably between about 1.5% to about 11% by weight of water based upon the weight of the solutions.

The amine oxide employed in the nylon solutions must display certain essential characteristics. The amine oxide must be substantially stable at least at about 125° C., preferably at about 130° C. and most preferably at about 140° C. and must contain a N-methylamine oxide group endo or exo to an aromatic or saturated or unsaturated ring i.e. corresponding to the formula

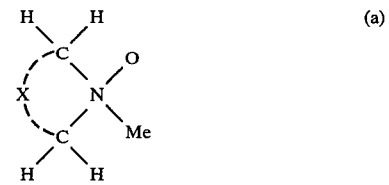

where X is a radical chain comprising 2 to 4 carbon atoms completing the ring;

where Me is methyl, and Z is (i) an aromatic or saturated or unsaturated 5, 6, or 7-membered ring, unsubstituted or substituted only by methyl in position where the resulting ring width is less than about 5.15 Å or (ii) $CH_2CH_2W$ where W can be OH, SH or $NH_2$.

Preferred tertiary amine oxides which may be used in practicing the invention include N-methylmorpholine N-oxide, and N,N-dimethylcyclohexylamine N-oxide.

The nylons which can be employed in this invention include any fiber forming nylon, having an amide group index of less than 145, and preferably less than 125, (amide group index—molecular weight of repeating unit÷number of amide groups per repeating unit). If desired, mixture of suitable nylon polymers can be employed. The presently preferred nylons include nylon 4, nylon 6, nylon 6,6 and nylon 6,T (polyhexamethylene terephthalamide). Nylon 6,9 or 6,10 can also be dissolved. The inventors have found that nylons such as nylon 6,12 and nylon 11 present significant difficulties when solutions are attempted.

The polyvinyl alcohol which can be employed in the compositions of this invention includes virtually any polyvinyl alcohol which is substantially hydrolyzed, including all commercially available uncrosslinked grades from low viscosity types to high viscosity types.

Polyvinyl alcohol solutions can be prepared in the presence of the above identified amine oxides in concentrations up to about 40% by weight or more in the presence of a solubility enhancing amount of water above about 3% by weight, preferably 5% and most preferably between about 6% and about 13% by weight of the solution. The maximum amount of polyvinyl alcohol which can be dissolved depends upon the particular amine oxide and the amount of water present. Preferably the amine oxide employed is the same amine oxide used to solubilize a nylon with which the polyvinyl alcohol solution is intended to be blended.

The biconstituent nylon-polyvinyl alcohol dispersions of the invention can be formed in a multiplicity of ways. The dispersion can be formed by codissolving the nylon and polyvinyl alcohol in an amine oxide solvent containing an amount of water which is an amount which enhances the solubility of both the nylon and polyvinyl alcohol; two separate polymer-amine oxide-water solutions can be prepared which are then blended; or preferably, a nylon-amine oxide solution containing an amount of water which enhances the solubility of both the nylon and polyvinyl alcohol is prepared, and then the polyvinyl alcohol polymer added thereto.

In any of the above processes, the biconstituent solutions of the invention are formed at a temperature above the precipitation or solidification point of any component in the solution and below the decomposition point of the dispersion or a component thereof. Preferably the dispersions are formed and maintained at a temperature below about 135° C. and preferably below about 130° C., temperatures above which the commencement of decomposition has been noted.

The biconstituent dispersions formed in the process of the invention are dispersions which comprise the nylon and the polyvinyl alcohol in separate distinct phases.

The ratio of nylon to polyvinyl alcohol in the dispersions of the invention can vary widely, for example, from about 1:99 to about 99:1 and preferably about 5:95 to about 95:5.

The total solids content of the dispersions is usually below about 50% and preferably less than about 30%.

If desired, a mixture of amine oxides can be employed in the dispersions of the invention, and when appropriate in the formation process, can be used to form any of the precursor solutions.

If desired, a non-reactive organic cosolvent may be used in quantities up to, for example, about 25% by weight of the total dispersion, and may be employed in quantities up to, for example, about 25% by weight of any precursor solution, as a less expensive diluent for the amine oxide, or to lower the viscosity of the solution.

The polyvinyl alcohol-nylon biconstituent dispersions of the invention are adapted for shaped article production such as by extrusion or spinning followed by coagulation in a non-solvent, for example, methanol to remove the solvent from the films or filaments having a biconstituent polymer composition wherein the two polymers comprise separate distinct interdispersed phases.

It is noted that the amine oxides contemplated by the invention are sometimes referred to as amine oxides. They are more properly termed "tertiary amine N-oxides".

There follow examples of the invention which are considered illustrative rather than limiting. All parts and percentages are by weight unless otherwise specified. All temperatures are degrees Centigrade. Solution water determinations in the examples were made using a C-Aqua-tester (Cat. No. 04-100-00, C. W. Brabender Instruments Co., S. Hackensack, New Jersey). The polyvinyl alcohol employed in the examples was 98–100% hydrolysed and had a viscosity of 55–65 cps. (4% aqueous solution at 20° C.).

EXAMPLE 1

Solutions of polyvinyl alcohol in N-methylmorpholine N-oxide containing various percentages of water were attempted. The results are summarized in Table 1.

TABLE 1

| PVA concentration % | Water concentration % | Temperature °C. | Dissolution Time Minutes | Remarks |
|---|---|---|---|---|
| 10 | 0 | 180 | 8–10 | No solution decomposed |
| 10 | 2 | 160 | 8–10 | Partial solution some decomposition |
| 10 | 6 | 130 | 8–10 | Light colored low visc. soln. |
| 10 | 8 | 125 | 8–10 | Light colored low visc. soln. |
| 10 | 10 | 120 | 8–10 | Light colored low visc. soln. |
| 10 | 12 | 115 | 8–10 | Slightly gel like soln. |
| 20 | 6 | 120–125 | 20–25 | Medium viscosity light colored soln. |
| 25 | 6 | 125 | 20–25 | High viscosity light colored soln. |
| 30 | 6 | 130 | 25–30 | High viscosity light colored soln. |
| 40 | 7.8 | 85 | 25–30 | Very high viscosity gel like soln. |

PVA was found soluble in other amine oxide-water mixtures for example:

10% PVA dissolved in N,N-dimethylethanolamine N-oxide containing 7% water at 145° C. to yield a light-colored, medium viscosity solution. However 20% PVA did not dissolve in the same solvent at temperatures up to 160° C. (decomposition was noted). Dissolution of up to 15% PVA in the solvent mixture was possible.

Likewise, up to 30% PVA could be dissolved in a N,N-dimethylcyclohexylamine N-oxide water mixture. Up to 10% PVA could be dissolved in a N,N-dimethylisopropanolamine N-oxide water-mixture.

EXAMPLE 2

A. 7.5 parts of ground, bright, undelustered nylon 6 chips were dissolved in 30 parts of N,N-dimethylcyclohexylamine N-oxide containing 11.2% water. The nylon chips dissolved in 30 minutes at 105°–110° C. to yield a moderately high viscosity, slightly yellow, clear solution which yielded a relatively weak fiber.

B. 5.3 parts of the nylon 6 and 2.2 parts of polyvinyl alcohol were dissolved in 30 parts of the amine oxide-water mixture in 25 minutes at 105°–110° C. The resultant biconstituent dispersion yielded a fiber slightly stronger than the fiber in A.

C. When 5.3 parts of the nylon 6 were dissolved in 30 parts of the amine oxide-water mixture and 2.2 parts of the polyvinyl alcohol added and dissolved into the nylon solution at 105°–110° C., the resultant biconstituent dispersion yielded an even stronger fiber.

Because of the solubility of PVA in water, the solutions were precipitated and washed with methanol to remove the amine oxide.

EXAMPLE 3

A nylon 6-polyvinyl alcohol codispersion was prepared in the following manner: 1.6 parts of dried, ground, bright undelustered nylon 6 chips (relative viscosity 2.45%–1% solution in 90% formic acid at 25° C.), 8.1 parts of N-methylmorpholine N-oxide containing 4.1% water, and 0.4 parts of water were placed in a glass vessel in a glycol bath maintained at 165° C. The mixture was stirred with a glass rod until a light colored clear solution was obtained (8–10 minutes). The solution was transfered to another glycol bath maintained at 150° C. (to maintain the solution at 145° C.). There was then added to the molten solution, with stirring, 0.6 parts of polyvinyl alcohol containing 4% water. There resulted a black dispersion containing 4.1% water. The dispersion when cast and washed with methanol yielded a relatively strong film.

EXAMPLE 4

A first solution was prepared by placing 8.4 parts of N-methylmorpholine N-oxide (NMMO) containing 4.1% water, 0.6 parts of water and 1.0 part of polyvinyl alcohol containing 4% water into a glass container in a glycol bath maintained at a temperature of 110° C. and stirring the mixture for about 10 minutes. There resulted a very light-colored, low viscosity solution.

A second solution was formed in a similar manner by admixing 3 parts of nylon 6 and 7 parts of NMMO containing 4.1% water (glycol bath 165°–168° C.) for about 10 minutes. The resultant solution was a medium viscosity, light colored solution.

5 parts of the second solution were remelted at 140° C. and 5 parts of the first solution added thereto with stirring. There resulted a black codispersion, containing 4.0% water which yield a moderately strong film.

EXAMPLE 5

A first solution was prepared by placing 6.4 parts of NMMO containing 4.1% water, 0.6 parts of water, and 3 parts of polyvinyl alcohol containing 4% water into a glass container in a glycol bath maintained at 110° C. and stirring the mixture for about 10 minutes. The resultant solution was a very light colored, medium viscosity solution (solution temperature 105° C.).

A second solution was formed in a similar manner by admixing 2 parts of nylon 6 and 8 parts of NMMO containing 4.1% water. The nylon 6 dissolved in about 10 minutes at 145° C. (glycol bath 170° C.). The resultant solution was a light colored, low viscosity solution.

A biconstituent dispersion was formed by remelting the nylon solution at 145° C. and adding the PVA solution to the nylon solution and stirring for 5 minutes. A black dispersion containing 3.4% water resulted which produced a film.

EXAMPLE 6

A first solution was prepared by placing 3 parts of nylon 6,T and 7 parts of NMMO containing 4.1% water into a blass container in a glycol bath maintained at a temperature of 165° C. and stirring the mixture. After about 30 minutes there resulted an amber colored solution (solution temperature 145°–150° C.).

A second solution was formed in a similar manner by admixing 8.4 parts of NMMO containing 4.1% water, 0.6 parts of water and 1 part of PVA containing 4% water at 105° C.

The two solutions were blended 1:1 by adding the PVA solution to the nylon solution at 145° C. and stirring for 5 minutes. The resultant dispersion, containing 3.7% water, was dark amber in color, with good stretchability.

EXAMPLE 7

In the manner of Examples 3–6 a nylon 6,9 solution was formed from 3 parts of nylon 6,9, and 7 parts of NMMO containing 4.1% water (145° C.—30 minutes).

The solutions were blended 1:1 with the PVA solution as in Example 6 by adding the PVA solution to the nylon solution at 145° C. to yield a black film forming dispersion containing 5.0% water.

It was noted by microscopic examination that the blends appeared to be immiscible and showed indications of decomposition above about 135° C.

The polyvinyl alcohol solutions useful in this invention are a subject of concurrently filed application Ser. No. 054,355 filed July 2, 1979 entitled "Composition and Process For Making Precipitated Cellulose-Polyvinyl Alcohol Biconstituent Composition" by the inventors herein, which application is hereby incorporated by reference.

It is noted that amine oxides ae hygroscopic and thus tend to pick up water from the air at normal temperature or up to a certain temperature, above which, when in admixture with water, they tend to release water vapor. The solution procedure and the water measurement procedure thus have some bearing on the amount of water initially employed and subsequently measured.

As used herein, "substantial stability" means sufficient stability to provide useful shaped polymer article forming solutions.

While the invention is described in detail above, it is understood that variation can be made by those skilled in the art without departing from the scope of the invention.

What is claimed is:
1. A biconstituent dispersion comprising:
 (A) a first distinct phase comprising a solution of
  (1) a nylon having an amide group index (molecular weight of repeating unit÷number of amide groups per repeating unit) or less than 145,
  (2) a tertiary amine oxide nylon solvent which has an N-methylamine oxide group endo or exo to an aromatic or saturated or unsaturated ring and which has substantial stability at about 125° C., and
  (3) a nylon solubility enhancing amount of water, and
 (B) a second distinct phase comprising a solution of
  (1) polyvinyl alcohol
  (2) a tertiary amine oxide polyvinyl alcohol solvent, and
  (3) a polyvinyl alcohol solubility enhancing amount of water.
2. The dispersion as in claim 1 where the nylon is nylon 4, nylon 6, nylon 6,6 or polyhexamethylene terephthalamide (nylon 6,T).
3. The dispersion as in claim 2 where the nylon is nylon 6 or nylon 6,6.
4. The dispersion as in claim 2 where the nylon is nylon 4.
5. The dispersion as in claim 2 where the nylon is polyhexamethylene terephthalamide (nylon 6,T).
6. The dispersion as in claims 1, 2, 3, 4, or 5 where the amine oxide is N-methylmorpholine N-oxide.
7. The dispersion as in claims 1, 2, 3, 4 or 5 where the amine oxide is N,N-dimethycyclohexylamine N-oxide.
8. The dispersion as in claims 1, 2, 3, 4, or 5 where the dispersion contains more nylon than polyvinyl alcohol.
9. The dispersion of claims 1, 2, 3, 4, or 5 where the dispersion contains more polyvinyl alcohol than nylon.

10. A process for forming a biconstituent dispersion of a nylon and polyvinyl alcohol adapted for use in forming shaped biconstituent polymer articles which comprises:
(A) separately forming a nylon solution comprising:
  (1) a nylon having an amide group index (molecular weight of repeating unit ÷ number of amide groups per repeating unit) of less than about 145,
  (2) a tertiary amine oxide nylon solvent which has an N-methylamine oxide group endo or exo to an aromatic or saturated or unsaturated ring and which has substantial stability at about 125° C., and
  (3) a nylon solubility enhancing amount of water,
(B) separately forming a polyvinyl alcohol solution comprising:
  (1) polyvinyl alcohol
  (2) a tertiary amine oxide polyvinyl alcohol solvent which has an N-methylamine oxide group endo or exo to an aromatic or saturated or unsaturated ring and which has substantial stability at about 125° C., and
  (3) a polyvinyl alcohol solubility enhancing amount of water
(C) admixing said separately formed solutions at a temperature adapted to maintain the nylon and polyvinyl alcohol in solution to provide a biconstituent dispersion.

11. The process as in claim 10 wherein the polyvinyl alcohol solution is added to the nylon solution.

12. The process as in claims 10 or 11 wherein the amine oxide employed in (a) and the amine oxide employed in (b) are solvents, in conjunction with water for both said nylon and said polyvinyl alcohol.

13. A process for forming a biconstituent dispersion of a nylon and polyvinyl alcohol adapted for use in forming shaped biconstituent polymer articles which comprises:
(A) forming a nylon solution comprising:
  (a) a nylon having an amide group index (molecular weight of repeating unit ÷ number of amide groups per repeating unit) of less than about 145,
  (2) a tertiary amine oxide nylon solvent which has an N-methylamine oxide group endo or exo to an aromatic or saturated or unsaturated ring and which has substatantial stability at about 125° C., and
  (3) a nylon and polyvinyl alcohol solubility enhancing amount of water,
(B) adding and dissolving therein polyvinyl alcohol thereby forming a biconstituent dispersion.

14. A process for forming a biconstituent dispersion of a nylon and polyvinyl alcohol adapted for use in forming shaped biconstituent polymer articles which comprises heating a mixture of:
(a) a nylon hving an amide group index (molecular weight of repeating unit ÷ number of amide groups per repeating unit) of less than about 145
(b) polyvinyl alcohol
(c) a tertiary amine oxide nylon and polyvinyl alcohol solvent which has an N-methylamine oxide group endo or exo to an aromatic or saturated or unsaturated ring and which has substantial stability at about 125° C., and
(d) a nylon and polyvinyl alcohol solubility enhancing amount of water to form a biconstituent dispersion.

* * * * *